No. 644,666. Patented Mar. 6, 1900.
M. W. DAY.
CONTROLLER FOR ELECTRIC MOTORS.
(Application filed Dec. 17, 1898.)
(No Model.) 3 Sheets—Sheet 2.
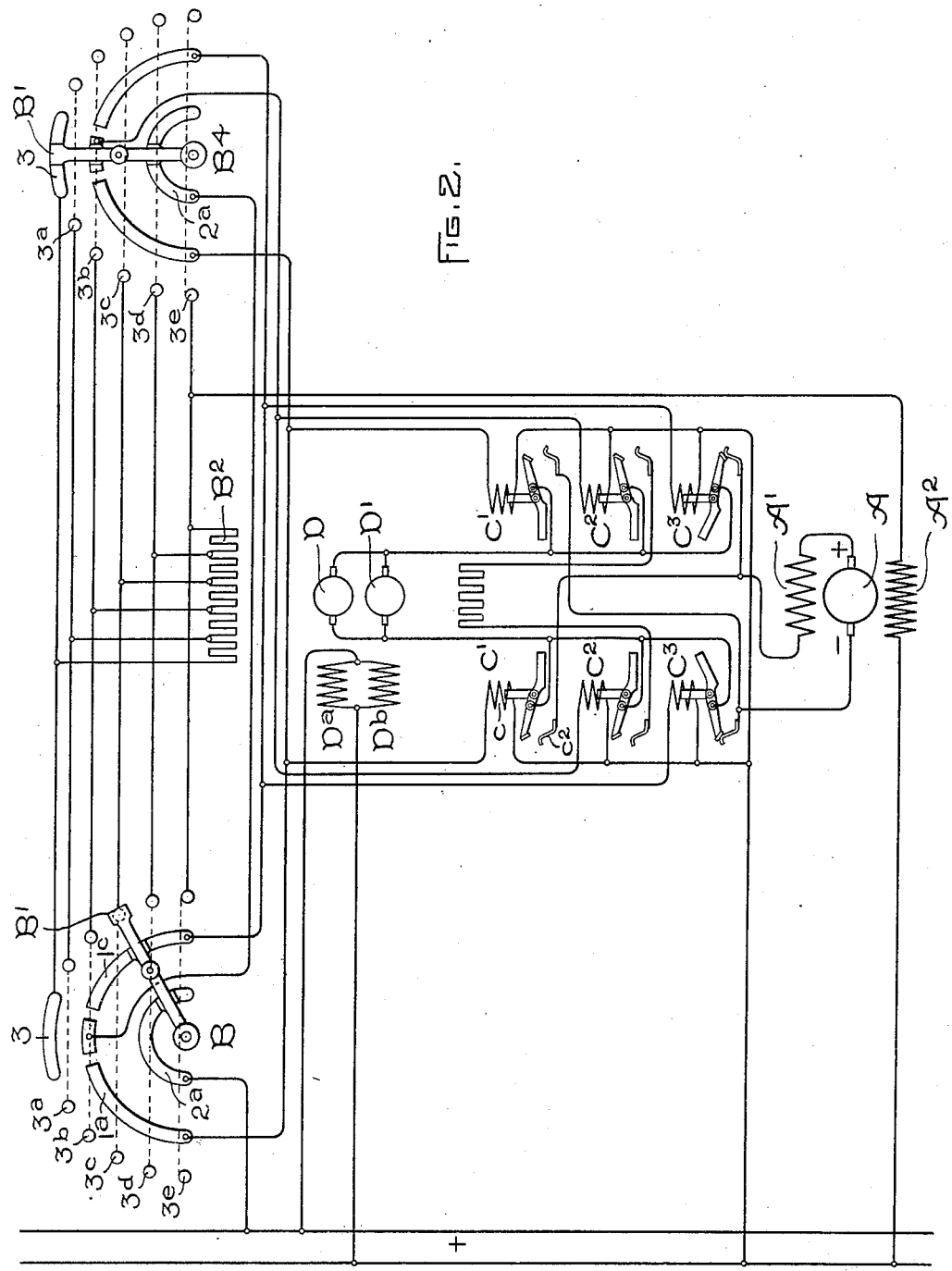
WITNESSES.
A. H. Abell.
B. V. Hull.
INVENTOR.
Maxwell W. Day,
by Albert G. Davis
Atty.

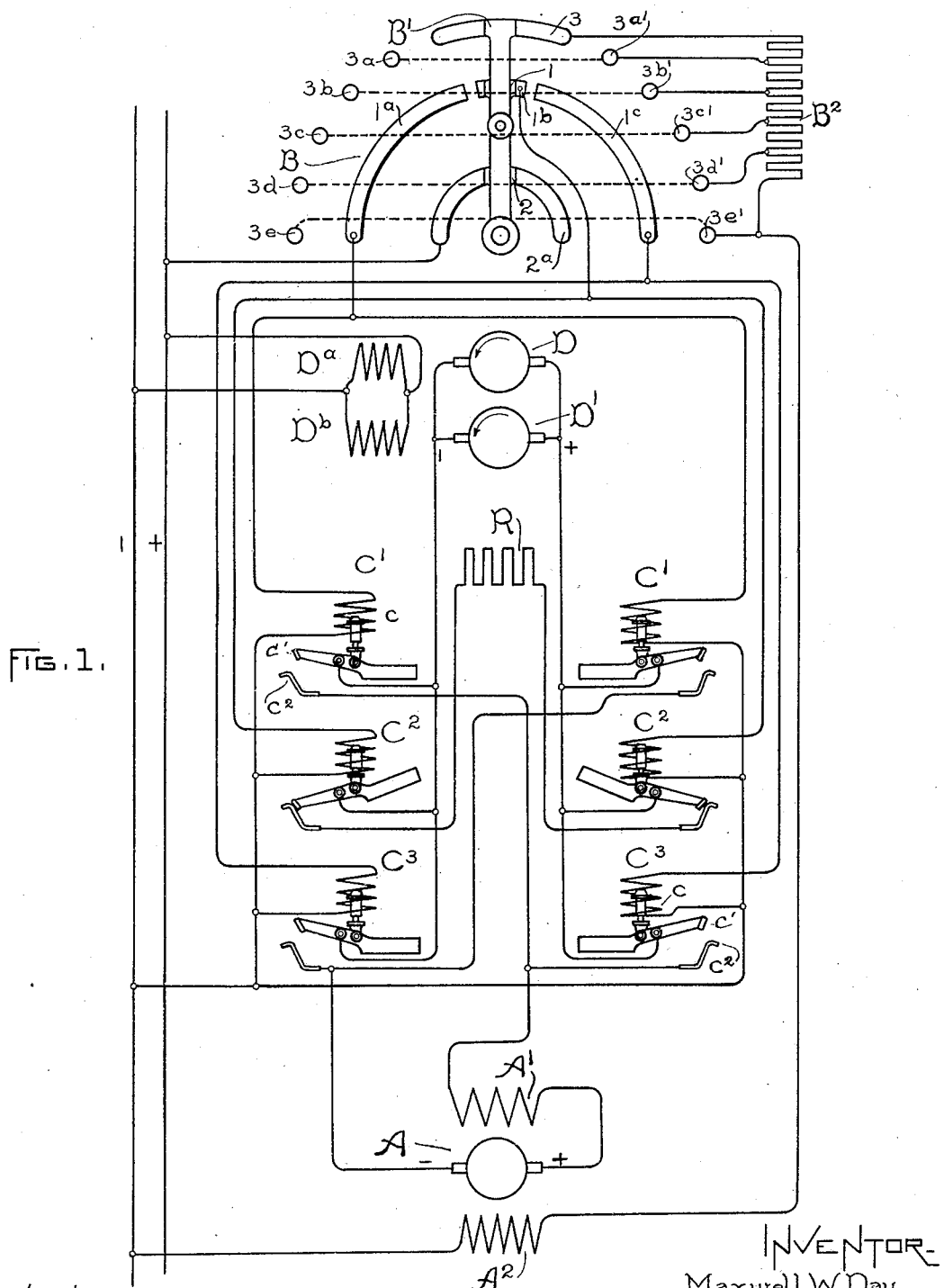

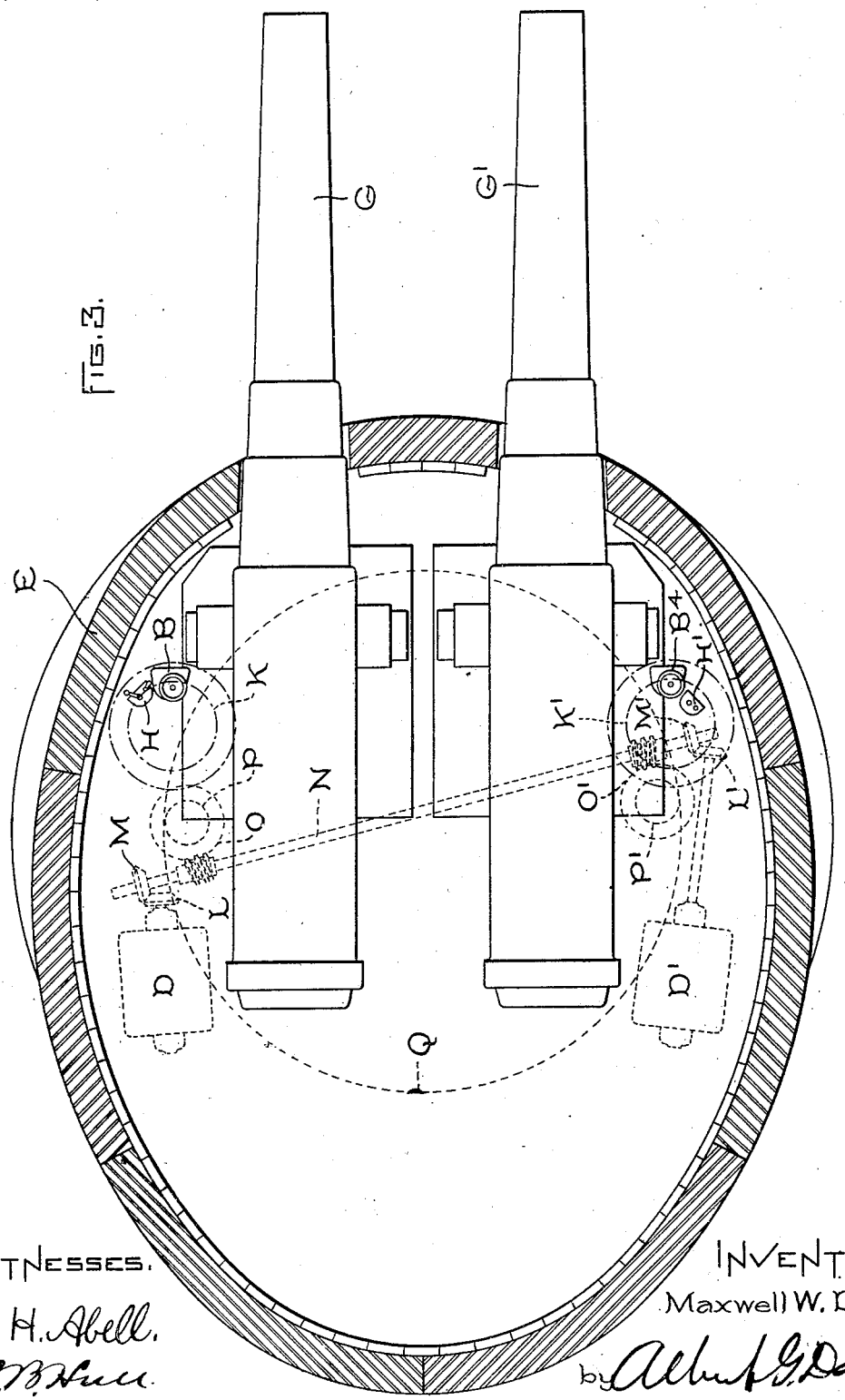

UNITED STATES PATENT OFFICE.

MAXWELL W. DAY, OF SCHENECTADY, NEW YORK, ASSIGNOR TO THE GENERAL ELECTRIC COMPANY, OF NEW YORK.

CONTROLLER FOR ELECTRIC MOTORS.

SPECIFICATION forming part of Letters Patent No. 644,666, dated March 6, 1900.

Application filed December 17, 1898. Serial No. 699,552. (No model.)

*To all whom it may concern:*

Be it known that I, MAXWELL W. DAY, a citizen of the United States, residing at Schenectady, in the county of Schenectady, State of New York, have invented certain new and useful Improvements in Controlling Electric Motors, (Case No. 847,) of which the following is a specification.

My present invention relates to electric motors, and, although useful in various relations, is particularly well adapted for use with motors used on war-ships to actuate the turrets.

It is at present customary to rotate each turret by one or more motors supplied with current from a special generator and to control the voltage of the generator and to reverse the motor-leads by a special switch or controller placed in the turret and in charge of a special operator. This makes it necessary to bring a number of leads, each capable of carrying a heavy current, from the generator and rheostat into the turret. Obviously these leads form a source of more or less danger and add to the resistance of the motor-circuits. In apparatus devised in accordance with my invention I make use of switches, preferably placed at the generator, capable of opening, closing, and reversing the circuit connections between the generator and the motor or motors and of short-circuiting the motors through a definite resistance, and control these switches and also regulate the generator-voltage by a simple switch in the turret. This avoids the necessity of carrying heavy currents to the controller and produces a simple, reliable, and effective system. My present invention also enables me to control one or more motors from any number of selected points. This is of advantage in various applications of electric motive power, but is of particular importance in connection with turrets. The present practice in such work is to place two guns in a turret and to provide a controller or other device at each gun to adjust the elevation of that particular gun and a third controller or device, usually located between the two guns, for rotating the turret. This requires three conning-towers per turret and three men and renders the sighting of a particular gun a divided operation under the control of two persons, which tends to confusion and error. By my improvements I am enabled to dispense with the central conning-tower and to give to each of the men at the elevation-controlling devices a controller capable of rotating the turret. This adds to the simplicity of the system and lessens the number of men required in each turret in action, and, further, reduces the cost of the turret and the number of weak points.

Many different arrangements might readily be made embodying the invention, as here indicated. I have not attempted to illustrate in detail the mechanical features of suitable devices, because these may be indefinitely varied and still be within the invention.

I have described my invention with particular reference to turret control; but it will be obvious that it is in some of its aspects equally applicable to various other uses—as, for example, elevators, hoists, &c.

In the drawings attached to this specification, which represent embodiments of my invention, Figure 1 is a diagram of a control system. Fig. 2 is a diagram of a modified form; and Fig. 3 is a plan view, partly in section, of a turret to which my improvements have been applied.

In Fig. 1, A is the generator, which is here shown as a compound-wound machine provided with the series field A' and the separately-excited field $A^2$, the latter being connected across the plus and minus mains supplied from the main lighting-station of the ship. It is understood that the dynamo A should have while the ship is in action no other office than to supply with current the motor or motors operating, for example, a turret. In series with the "shunt-field," as it may be called for convenience, is a resistance $B^2$. This resistance is regulated by the switch B, which is provided with the usual switch-arm B', and a contact 3, which serves to regulate the resistance. The action is the same upon each side of the central position, the contacts $3^a$ $3^{a'}$, &c., being connected to different points in the resistance in a way well understood. This switch is further provided with contacts 1 and 2, which register, respectively with contacts $1^a$, $1^b$, $1^c$, and $2^a$, the latter contact being connected to the plus main of the system and furnishing current to the switch. The field-magnets $D^a$ and $D^b$ of the motors D D' are also excited from the mains, as shown. No resistance is ordinarily employed to regulate these fields, since they are ordinarily kept constant, and the speed of the motor is controlled by varying the voltage supplied to its armature-terminals. Controlling the motor-circuit are pairs of electromagnetically operated or controlled switches C' $C^2$, &c. These each consist of a coil $c$, a switch-blade $c'$, and a contact $c^2$, with which the switch-blade may register when the switch is closed. They are shown in diagrammatic form; but several forms of electromagnetically-controlled switches are now well known in the art, and any preferred type may be used. At R is shown a resistance on which the circuit of the motor-armatures is closed when the switch B is in its illustrated position. This resistance is so chosen that it permits the generation of sufficient current to bring the motors immediately to a stand, but does not allow enough to flow to overheat the motor.

The various connections will be apparent without special description. The operation of the parts here illustrated is as follows: Assuming that the motors are to be started, the switch-arm B' is moved to the right, for instance, thus progressively cutting out the sections of the resistance $B^2$ from the circuit of the field $A^2$ and raising the voltage of the dynamo, so that a higher and higher electromotive force is furnished to the motors, which start and begin to run, the counter electromotive force rising as the speed increases, so that the voltage may be progressively increased without danger. This movement of the switch-arm B' brings the contact 1 upon the contact $1^c$, and current then flows from the plus main through the leads connected to the contact $1^c$ to the switches $C^3$ $C^3$. When these switches are operated, current flows from the plus brush of the dynamo A through the series field A' over the right-hand switch $C^3$ to the plus terminals of the motors to the other switch $C^3$ and back to the dynamo A. The motors now start and continue to revolve, for example, in the direction shown by the arrows so long as the switch-arm B' is moved to the right or remains upon the contact $1^c$. When the switch-arm is returned to its illustrated position, current flows from the plus main to the contact $1^b$ and thence over the lead to the pair of switches $C^2$ $C^2$, as illustrated, connecting the motor-armatures in a closed circuit in series with the resistance R. When the switch-arm is moved to the left, current passes to the contact $1^a$, thence to the switches C', and on tracing the circuit it will be found that the current flow in the armatures of the motors is reversed, the fields remaining unchanged, so that the motors revolve in the opposite direction.

Of course a single motor or more than two may be employed, if desired.

The arrangement of the apparatus is simple and convenient, and the heavy contacts which carry any substantial amount of current may be located in the dynamo-room, where they may be readily inspected and kept in order and the operation of the device watched.

In the practical operation of such systems I find that the presence of the resistance R in the "stop" position is of the highest importance, as if the motor-armatures are directly short-circuited enormous currents flow, and the whole system is subjected to great strain. This is particularly true in turret control, where the moment of inertia of the turret, guns, &c., is very high.

The master-switch is preferably located near the motors or driven mechanism. In turret-work, for example, it may be located in the turret itself.

The apparatus thus far described is highly satisfactory in all classes of work in which the load is to be controlled from a single point only, as in elevators; but in turret-work, for reasons fully set forth above, I prefer to use the arrangement shown in Fig. 2. Referring then to Fig. 2, it will be seen at once that all the parts are the same as before, except that the master-controller B is duplicated, as shown at B $B^4$. Current enters from the plus main to the contact $2^a$ of the first or left-hand master-controller B and passes when the arm B' is in the central position to the contact $2^a$ of the second controller $B^4$ and thence to the switches $C^2$, as before. The contacts 3 $1^a$ $1^c$ $3^a$ $3^b$ $3^c$ $3^d$ $3^e$ of the two controllers are cross-connected, as shown.

Fig. 3 shows a turret arranged for the application of the system shown in Fig. 2. E is the turret carrying the guns G G', each of which is elevated and depressed by a special motor (not shown) controlled, respectively, by the controllers H H'. These controllers are located under conning-towers located as indicated by the dotted circles K K', but above the plane of the section. The turret as a whole is mounted to rotate in the usual way under the action of the motors D D', working through gears L M L' M', the shaft N and the worm-gears O O' on the pinions P P', and the internal gear Q. This gear Q is fastened rigidly to the turret itself, so that the two motors act conjointly to rotate the turret. The electrical connections of these motors are as shown in Fig. 2, and are so arranged, as explained above, as to be capable of control from either one of two master-controllers B $B^4$. The action of this apparatus is as follows: Normally both of the handles B' of the controllers B $B^4$ are placed in the central or off position. Each of the two operators—that at the conning-tower K and that at the conning-tower K'—is able to elevate his gun and depress it at will. Suppose that the gun G' has just been discharged and that the operator at K wishes to "sight" his gun G, the elevation being already correct. He moves the handle B' of his controller B, for example, to the position shown in Fig. 2. This open-circuits the contact 1$^b$ of the controller B, and thus cuts off current entirely from the controller B$^4$ and also opens the switches C$^2$ and closes the switches C$^3$. The motors will now start up and run at a speed determined by the position of the handle B' and the whole turret will be under the control of the operator at K. In a similar way the operator at K' can at will take up the control whenever the handle B' of the controller B is in the off position.

What I claim as new, and desire to secure by Letters Patent of the United States, is—

1. The combination, in a motor-regulating system, of a dynamo-electric machine, one or more motors at a distant point supplied with current from the dynamo, switches located near the dynamo for varying the circuit relation between it and the motors, and means adjacent to the motors for operating the switches.

2. The combination, in a motor-regulating system, of a dynamo-electric machine, one or more motors at a distant point supplied with current from the dynamo, electromagnetic switches located near the dynamo for varying the circuit relation between it and the motors, and means adjacent to the motors for operating the switches.

3. The combination of a source of electric energy, one or more motors, electromagnetically-controlled switches connecting the motors in various circuit relations to the source of energy, a switch for varying the electromotive force of the source, to regulate the speed and torque of the motors, and contacts on the switch controlling the motor-switches.

4. In a system of control for electric motors, the combination of a generator, one or more electric motors supplied from the generator, a motor-regulating switch, electromagnetic switches for regulating the relation of the motors and generator, and contacts on the regulating-switch for controlling the electromagnetic switches.

5. The combination of a generator, one or more electric motors fed from the generator, a resistance-switch for controlling the generator-field, electromagnetic switches for starting, stopping or reversing the motors, and contacts on the field-regulating switch for controlling the electromagnetic switches.

6. In a motor system for turret control or the like, the combination of a generator with one or more motors at a distant point, electromagnetic switches located near the generator and connected to pass current through the motor-armature in either direction or close its circuit through a resistance as may be desired, a switch adjacent to the motors for regulating their speed and torque, and contacts on the switch for controlling the operation of the electromagnetic switches.

7. The combination of a generator supplying one or more electric motors, a switch regulating their speed and torque, electromagnetic switches in pairs controlling their relation to the generator so as to determine their direction of rotation, other electromagnetic switches for closing their armature-circuits through a resistance, and means for operating the electromagnetic switches at desired times.

8. In a system of control for electric motors, in combination, a generator, one or more motors supplied with current therefrom, switches normally open and arranged to close the circuit of said motors for rotation in either direction, other switches normally closed and arranged to short-circuit the motor through a suitable resistance, and means for controlling the operation of said switches from a distant point.

9. In a system of control for electric motors, in combination, a generator, one or more motors supplied with current therefrom, switches normally open and arranged to close the circuit of said motors for rotation in either direction, other switches normally closed and arranged to short-circuit the motor through a suitable resistance, and a controlling-switch for controlling the operation of said switches.

10. The combination with a dynamo-electric machine, of one or more motors supplied with current thereby, switch-contacts for varying the motor connections, and means controlled from a plurality of separate points for controlling the said switch-contacts and for varying the voltage of the dynamo.

11. The combination with a dynamo-electric machine, of one or more motors supplied with current thereby, switch-contacts for varying the motor connections, and means controlled from a plurality of separate points for controlling the said switch-contacts, for varying the voltage of the dynamo, and for short-circuiting the motors through a suitable resistance.

12. In combination, a motor or motors, switches for said motors, a plurality of switches for controlling the operation of said motor-switches, and circuit connections such that the operation of one of said controlling-switches opens the circuit of the other of said switches.

In witness whereof I have hereunto set my hand this 16th day of December, 1898.

MAXWELL W. DAY.

Witnesses:
B. B. HULL,
GENEVIEVE HAYNES.